(12) United States Patent
Klemm et al.

(10) Patent No.: US 11,920,702 B2
(45) Date of Patent: Mar. 5, 2024

(54) CONNECTING ELEMENT FOR A PIPE ARRANGEMENT AND ARRANGEMENT

(71) Applicant: TI Automotive Engineering Centre (Heidelberg) GmbH, Heidelberg (DE)

(72) Inventors: Jochen Klemm, Ittlingen (DE); Matthias Winter, Rastatt (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 17/550,447

(22) Filed: Dec. 14, 2021

(65) Prior Publication Data

US 2022/0186859 A1    Jun. 16, 2022

(30) Foreign Application Priority Data

Dec. 15, 2020  (EP) .................................... 20214022

(51) Int. Cl.
| | | |
|---|---|---|
| *F16L 13/08* | (2006.01) | |
| *B23K 1/18* | (2006.01) | |
| *F16L 41/08* | (2006.01) | |
| *B23K 101/06* | (2006.01) | |

(52) U.S. Cl.
CPC ................ *F16L 13/08* (2013.01); *B23K 1/18* (2013.01); *F16L 41/084* (2013.01); *B23K 2101/06* (2018.08)

(58) Field of Classification Search
CPC .................................. F16L 13/08; F16L 41/084
See application file for complete search history.

(56) References Cited

U.S. PATENT DOCUMENTS

| | | | | | |
|---|---|---|---|---|---|
| 519,372 | A | * | 5/1894 | Young .................... | F16L 13/122 285/289.1 |
| 1,515,750 | A | * | 11/1924 | Pasman .................... | F16L 25/14 285/289.1 |
| 1,889,974 | A | * | 12/1932 | Chamberlain ........... | B23K 1/20 285/289.2 |
| 2,033,122 | A | * | 3/1936 | Cornell, Jr. ............. | F16L 13/08 285/289.1 |
| 3,680,200 | A | * | 8/1972 | Terrill ...................... | B23K 1/06 285/289.1 |

(Continued)

FOREIGN PATENT DOCUMENTS

| | | | | |
|---|---|---|---|---|
| CN | 208417841 U | | 1/2019 | |
| DE | 102008047076 A1 | * | 3/2010 | ........... B23K 1/0008 |

(Continued)

OTHER PUBLICATIONS

Chinese Office Action and Search Report dated Jun. 3, 2023.
Japanese Office Action dated Feb. 28, 2023.

*Primary Examiner* — Zachary T Dragicevich
*Assistant Examiner* — James A Linford
(74) *Attorney, Agent, or Firm* — Dickinson Wright PLLC

(57) ABSTRACT

A connecting element for a pipe arrangement, comprising a base body with at least one through channel, a receiving bore for receiving a pipe end of a pipe, wherein the receiving bore corresponds with the through channel, wherein the receiving bore has a larger cross section than the through channel, wherein a transition step is introduced into the base body between the through channel and the receiving bore, and an arrangement and a method for manufacturing an arrangement.

15 Claims, 4 Drawing Sheets

(56) References Cited

U.S. PATENT DOCUMENTS

| | | | | |
|---|---|---|---|---|
| 3,750,248 | A | * | 8/1973 | Morris ...................... F28F 1/32 228/183 |
| 3,957,289 | A | * | 5/1976 | Kilgore ................ B23K 1/0012 228/259 |
| 5,400,951 | A | * | 3/1995 | Shiroyama ....... F02M 35/10144 285/289.5 |
| 5,524,938 | A | * | 6/1996 | Halder .................. F28F 9/0246 285/305 |
| 6,631,740 | B1 | | 10/2003 | Jackson et al. |
| 7,086,668 | B2 | * | 8/2006 | Takasaki ............... F16L 39/005 285/123.3 |
| 11,359,838 | B2 | * | 6/2022 | Se .......................... B21D 39/20 |
| 2003/0218332 | A1 | * | 11/2003 | Takasaki ................... F28F 9/02 285/123.3 |
| 2011/0114216 | A1 | * | 5/2011 | Blueml .................. F16L 13/08 219/616 |

FOREIGN PATENT DOCUMENTS

| | | | |
|---|---|---|---|
| EP | 3189922 | A1 | 1/2017 |
| EP | 3575660 | A1 | 5/2018 |
| FR | 1152271 | A * | 2/1958 |
| JP | H09236188 | A | 9/1997 |

* cited by examiner

CONNECTING ELEMENT FOR A PIPE ARRANGEMENT AND ARRANGEMENT

RELATED APPLICATIONS

The present disclosure is a national phase application of European Application 20214022.4, filed on Dec. 15, 2020, the entire contents of each of which are incorporated herein by reference.

FIELD

The disclosure relates to a connecting element for a pipe arrangement, comprising a base body having at least one through channel and a receiving bore for receiving a pipe end, wherein the receiving bore corresponds with the through channel, wherein the receiving bore has a larger cross section than the through channel. The disclosure further relates to an arrangement with a connecting element and a pipe.

BACKGROUND

Such a connecting element and such an arrangement are known from the prior art. Such connecting elements and arrangements are frequently used in air-conditioning technology, for example in air-conditioning systems or coolant circuits. In this context, the arrangement is particularly suitable for mobile devices for temperature control, for example in electric vehicles or in systems for vehicle air conditioning. The connecting element can be used to connect different pipes of a pipe arrangement or pipes to other pipes or to different components of an air conditioning system. Depending on the coolant used, extremely high pressures can be generated within the air conditioning system. In this context, it is therefore known to fasten pipes in the receiving bore of connecting elements by a substance-to-substance bond by means of a soldered connection. Soldered connections are mechanically very resilient and have a very good permanent tightness. Therefore, such arrangements are in principle suitable to be used in air conditioning systems with $CO_2$ as coolant. Due to the thermodynamic properties of $CO_2$, however, the arrangement must be able to withstand pressures of up to 135 bar. Due to its good other thermodynamic properties, $CO_2$ is particularly suitable for use in mobile air conditioning systems, for example in motor vehicles.

We have discovered that the design of the pipe ends is often formed not planar due to the production process and is cut in a conical shape. If the pipe end is inserted into the receiving bore, gaps can therefore occur which can lead to air pockets during the soldering process. Air pockets, in turn, are associated with reduced mechanical resilience, which can result in a loss of coolant in continuous operation.

BRIEF SUMMARY

The object of the present disclosure is to provide a connecting element for a pipe arrangement and an arrangement with improved permanent tightness and mechanical resilience.

The connecting element for a pipe arrangement according to the present disclosure comprises a base body having at least one through channel and a receiving bore for receiving a pipe end, wherein the receiving bore corresponds with the through channel, wherein the receiving bore has a larger cross section than the through channel, wherein a transition step is introduced into the base body between the through channel and the receiving bore.

The transition step forms a reservoir to be able to accommodate sections that, due to production, protrude from the end of the pipe. This makes it possible to ensure that the pipe end abuts against the bottom of the receiving bore over the circumference. In the contact area between the connecting element and the pipe, this results in only very small gaps, so that the solder can fill the gap between the connecting element and the pipe essentially without voids. This results in a defined gap with a constant gap width, which is combined with a uniform absorption capacity for the solder, through which the pipe is firmly connected to the connecting element.

The diameter of the transition step is preferably larger than the diameter of the through channel and smaller than the diameter of the receiving bore. The diameter of the through channel preferably corresponds with the diameter of the pipe to be inserted into the receiving bore. As a result, the pipe abuts against the bottom of the receiving bore in the area of the outer circumference and the inner circumferential part of the pipe corresponds with the transition step.

The transition step may have a radial section and an axial section, and the transition between the radial section and the axial section may be rounded. Alternatively, the transition can also have a different geometric shape, such as a slope, step or chamfer. Due to this design, the connecting element is mechanically resilient to a particularly high extent. Furthermore, the transition step reduces the risk of solder getting into the through channel.

The bottom of the receiving bore may be tapered. The slope of the bottom preferably leads into the transition step. This design with a slanted bottom and transition step is particularly suitable for receiving pipes which have been cut to size by means of a pipe cutter. A pipe cutter comprises cutting wheels which are guided around the outer circumference of the pipe. In this process, the cutting wheels of the pipe cutter cut a notch in the outer circumference of the pipe and the pipe sections cut off by the pipe cutter are separated from each other by applying a tensile force before the cutting wheels have completely cut through the pipe. This process ensures a constant internal diameter of the cut pipe. Furthermore, in industrial production, the cut-off pipe end is often not deburred. As a result, the pipe end has a protruding burr on the inner circumferential edge. Due to the cutting wheels, the pipe end does not form a flat cutting surface but is tapered. Due to the design of the connecting element according to the disclosure, a pipe that has been cut to size in this way can be inserted into the receiving bore of the connecting element with an accurate fit. A defined gap results between the connecting element and the pipe, which can be filled evenly by the solder.

The receiving bore can open into a cross section expansion on the side facing away from the transition step. The cross-section expansion forms a solder pocket surrounding the receiving bore. On the one hand, this can be used to accommodate a solder ring, which is heated after the pipe is inserted into the receiving bore. In the process, the solder melts and fills the gap between the pipe and the connecting element. However, it is also conceivable to insert a solder ring before inserting the pipe into the receiving bore, and then insert the pipe. The solder melts when the connecting element is heated. The molten solder fills the gap between the pipe and the connecting element and rises into the cross-section expansion. The solder absorbed by the cross-section expansion can be used to check the extent to which the soldering process has produced a stable connection between the pipe and the connecting element.

The solder ring is preferably made of copper or a copper alloy. However, the solder ring can also be made of other metallic materials or alloys.

An arrangement according to the disclosure comprises a connecting element as previously described and a pipe, the pipe end of which is inserted into the receiving bore.

In this case, the pipe end may have a circumferential burr on the inner circumferential edge, wherein the burr protrudes into the transition step. This enables the simple and cost-effective production of a pipe of a desired length. At the same time, the design of the connecting element can ensure that the pipe end abuts against the bottom of the receiving bore. The burr on the inner circumferential edge of the pipe end protrudes into the transition step. In this respect, the transition step forms a receiving reservoir for protruding sections of the pipe.

The face of the pipe end may be tapered. This embodiment results when the pipe is cut to size using a pipe cutter. By means of the pipe cutter the pipe can be cut quickly and economically.

The connecting element and the pipe can be connected by a substance-to-substance bond by means of a soldered connection. A soldered connection is a permanently tight and mechanically resilient connection of connecting element and pipe.

Such an arrangement is particularly suitable for use in air conditioning systems. Particularly suitable is the use in air conditioning systems with CO2 as coolant. However, the arrangement is also suitable for other applications, such as fuel lines. The arrangement according to the disclosure is used in particular in air conditioning systems and coolant circuits of motor vehicles.

In the method for manufacturing an arrangement according to the disclosure, a pipe is first cut to size by means of a pipe cutter, a solder ring is added, and the pipe end is inserted into the receiving bore, wherein the burr of the pipe end protrudes into the transition step. The arrangement is then heated so that the solder melts and rises between the inner wall of the receiving bore and the outer wall of the pipe. In doing so, excess solder can be absorbed in the cross-section expansion.

According to a first alternative of the method, the solder ring is inserted into the receiving bore and then the pipe is inserted into the receiving bore. As a result, the solder ring is located inside the connecting element between the pipe and the connecting element.

According to a second alternative, the solder ring is pushed onto the pipe and the pipe is then inserted into the receiving bore, wherein the solder ring comes to rest in the cross-section expansion before the soldering process.

BRIEF DESCRIPTION OF THE DRAWINGS

Some embodiments of the connecting element according to the disclosure and of the arrangement according to the disclosure will be explained in more detail below with reference to the figures. These show, each schematically.

DETAILED DESCRIPTION

Figure 1:
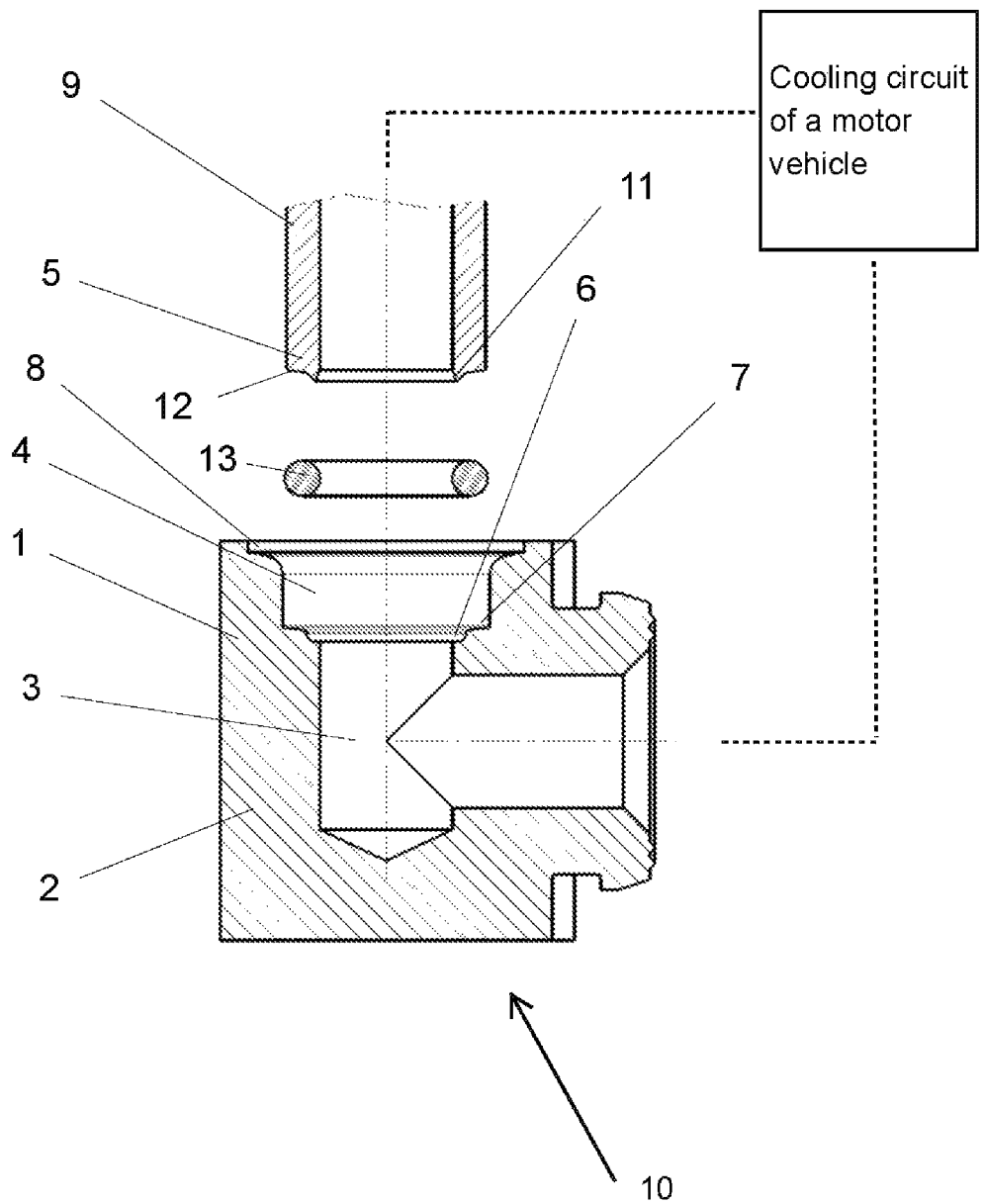
FIG. 1 a sectional view of an arrangement with connecting element, pipe and solder ring before joining.

The figures show an arrangement 10 having a connecting element 1 and a pipe 9. The arrangement 10 is part of an air conditioning system using CO2 as coolant.

The connecting element 1 comprises a base body 2 made of metallic material, for example steel, stainless steel or aluminium. The base body 2 is provided with a through channel 3, wherein the through channel 3 corresponds with a receiving bore 4 for receiving a pipe end 5 of the pipe 9. In this case, the receiving bore 4 has a larger cross section than the through channel 3. The diameter of the receiving bore 4 is designed such that the pipe end 5 of the pipe 9 can be received with clearance. The diameter of the through channel 3 corresponds substantially with the internal diameter of the pipe 9. In alternative embodiments, it is also conceivable that the pipe end 5 of the pipe 9 is received in the receiving bore 4 via a press fit. The pipe 9 is also formed of metallic material, for example steel, stainless steel or aluminium.

A transition step 6 is introduced into the base body 2 between the through channel 3 and the receiving bore 4. In this case, the diameter of the transition step 6 is larger than the diameter of the through channel 3 and smaller than the diameter of the receiving bore 4. The transition step 6 has a radial section and an axial section, and the transition between the radial section and the axial section is rounded.

The bottom 7 of the receiving bore 4 is tapered. The receiving bore 4 opens into a cross section expansion 8 on the side facing away from the transition step 6.

The pipe end 5 has a circumferential burr 11 on the inner circumferential edge, wherein the burr 11 protrudes into the transition step 6. The end face 12 of the pipe end 5 is tapered.

FIG. 1 shows the arrangement 10 before the pipe 9 is inserted into the receiving bore 4.

Figure 2:
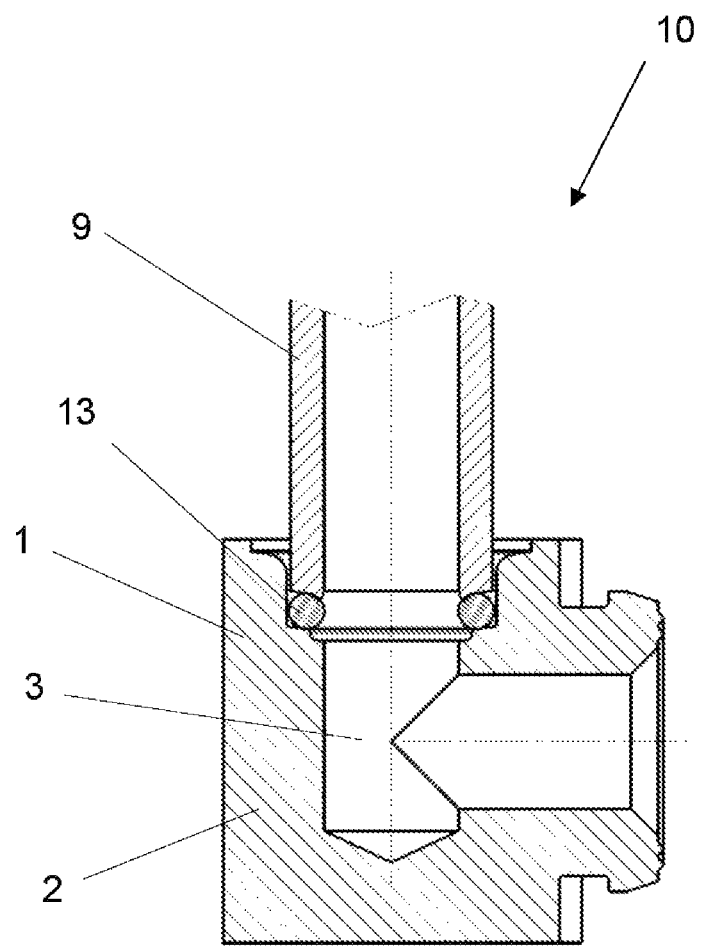
FIG. 2 the arrangement according to FIG. 1 with the pipe and solder ring inserted in the receiving bore.

FIG. 2 shows the arrangement 10 according to FIG. 1, wherein the pipe 9 is inserted into the receiving bore 4. A solder ring 13 is located in the receiving bore 4 between the pipe 9 and the transition step 6.

Figure 3:
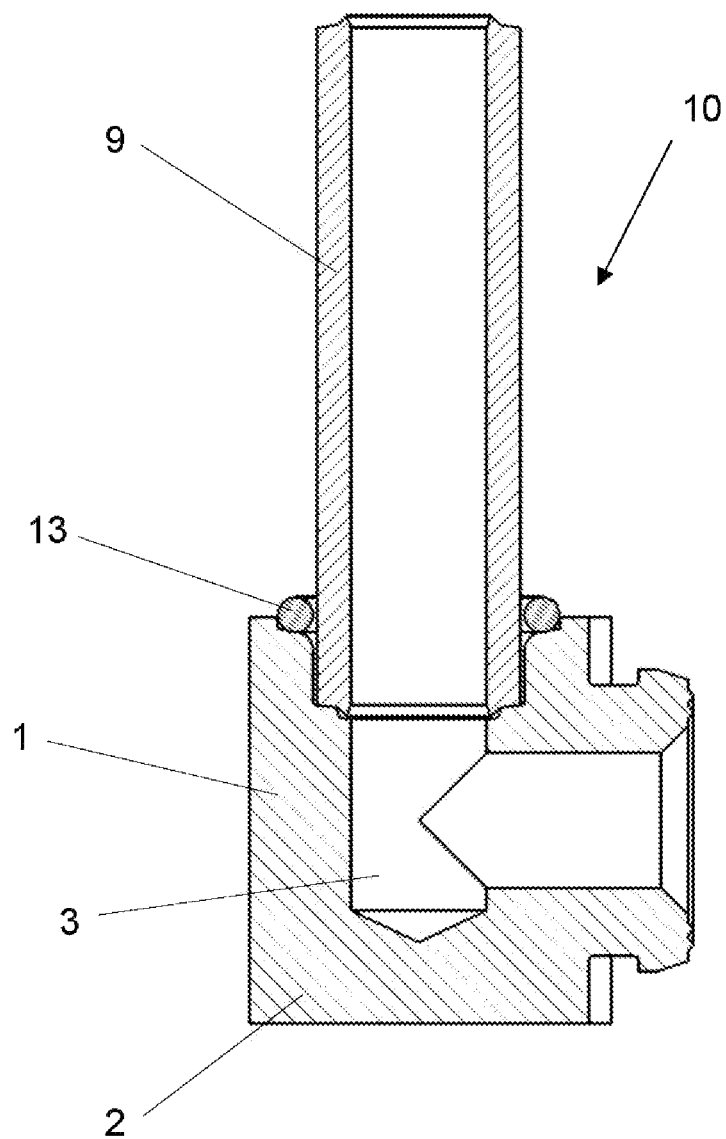
FIG. 3 the arrangement according to FIG. 1 with the solder ring pushed onto the pipe.

FIG. 3 shows the arrangement 10 according to FIG. 1, wherein the pipe 9 is inserted into the receiving bore 4. A solder ring 13 is pushed onto the pipe 9, wherein the solder ring 13 rests in the cross-section expansion 8.

Figure 4:
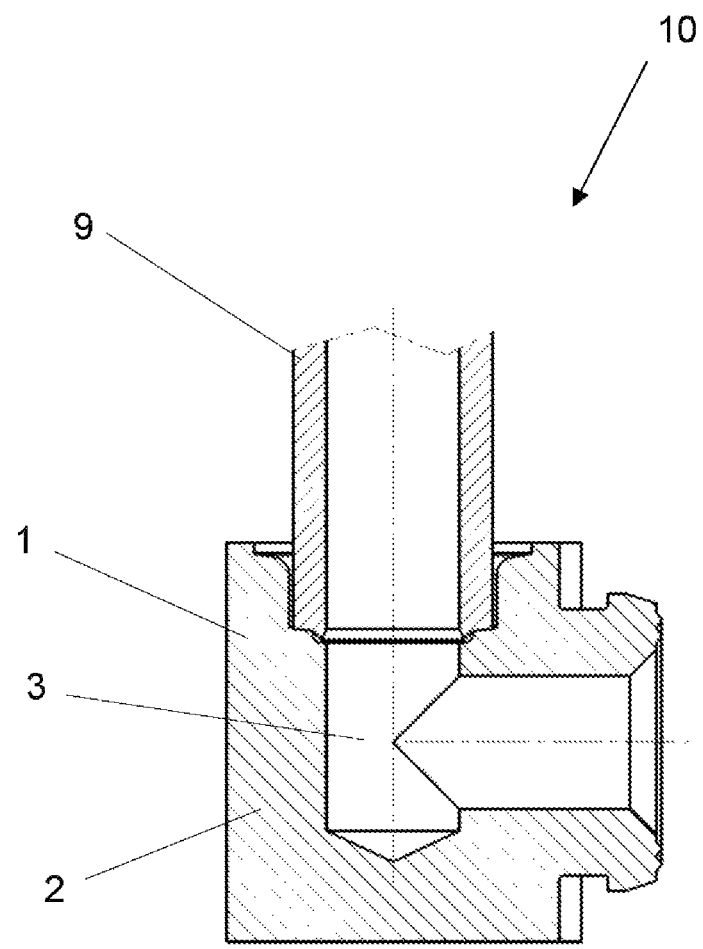
FIG. 4 the arrangement shown in FIG. 1 after the soldering process has been completed.

FIG. 4 shows the arrangement 10 according to FIG. 1, in which the pipe inserted into the receiving bore 4 is connected to the connecting element 1 by a substance-to-substance bond by means of a soldered connection. In this case, excess solder is accommodated in the transition step 6 and in the cross-section expansion 8. Based on the amount of solder taken up in the cross-section expansion 8, a non-destructive quality check of the solder connection can be carried out.

To manufacture the arrangement 10, the pipe 9 is first cut to size using a pipe cutter. The pipe cutter has cutting wheels which are guided over the outer circumference of the pipe 9. Due to the cutting process, a circumferential burr 11 is formed on the inner circumferential edge of the pipe 9. Due to the geometry of the cutting wheels, the end face 12 of the pipe end 5 is tapered.

In the next step, a solder ring 13 is inserted into the receiving bore 4 of the connecting element 1, and the pipe end 5 of the pipe 9 is inserted into the receiving bore 4 so that the solder ring 13 is arranged between the end face 12 of the pipe 9 and the transition step 6. The arrangement 10 is then heated so that the solder melts and fills the gap between the inner wall of the receiving bore 4 and the outer wall of the pipe 9. In doing so, the solder rises in the gap and excess solder is absorbed by the cross-section expansion 8. If, after soldering is completed, the cross-section expansion 8 is evenly filled with solder, this is an indication of a proper soldering process.

In an alternative method, a solder ring 13 is pushed onto the pipe 9 and then the pipe 9 is inserted into the receiving bore 4 of the connecting element 1. In this case, the solder ring 13 comes to rest in the cross-section expansion 8. The arrangement 10 is then heated so that the solder melts and fills the gap between the inner wall of the receiving bore 4 and the outer wall of the pipe 9.

The invention claimed is:

1. A pipe arrangement comprising:
   a pipe having a circumferential burr at an inner circumferential edge of an end of the pipe; and
   a connecting element having a base body with a through channel, the base body having a receiving bore receiving the pipe end of the pipe, wherein the receiving bore corresponds with the through channel, wherein the receiving bore has a larger cross section than the through channel, and wherein a transition step is formed in the base body between the through channel and the receiving bore,
   wherein the transition step has a radial section and an axial section, and wherein a transition between radial section and axial section is rounded to form a curvature extending in the axial direction, and
   wherein the axial section of the transition step is sized and positioned such that it receives the circumferential burr of the pipe.

2. The pipe arrangement according to claim 1, wherein the diameter of the transition step is larger than the diameter of the through channel and smaller than the diameter of the receiving bore.

3. The pipe arrangement according to claim 1, wherein the bottom of the receiving bore is tapered.

4. The pipe arrangement according to claim 1, wherein the receiving bore opens radially into a cross section expansion on a side facing away from the transition step.

5. The pipe arrangement according to claim 1, wherein an end face of the pipe end is tapered.

6. The pipe arrangement according to claim 1, wherein the connecting element and the pipe are connected in a substance-to-substance manner by way of a soldered connection.

7. The pipe arrangement according to claim 1, wherein the pipe has an end face, the end face including an outer circumferential portion that faces axially, and wherein the circumferential burr at the inner circumferential edge of the pipe projects axially from a plane defined by the outer circumferential portion of the end face.

8. The pipe arrangement according to claim 7, wherein the radial section of the transition step receives the inner circumferential edge of the pipe, and wherein the axial section receives the circumferential burr of the pipe.

9. The pipe arrangement according to claim 1, wherein the receiving bore transitions into the radial section of the transition step, and wherein the axial section of the transition step transitions into the through channel.

10. The pipe arrangement according to claim 1, wherein the axial section of the transition step has a diameter greater than a diameter of the through channel.

11. A cooling circuit of a motor vehicle, comprising at least one arrangement according to claim 1.

12. A method of manufacturing the pipe arrangement according to claim 1, the method comprising:
    cutting the pipe to size by way of a pipe cutter;
    adding a solder ring;
    inserting the pipe end of the pipe into the receiving bore of the connecting element, wherein a burr of the pipe end protrudes into the axial section of the transition step; and
    heating the arrangement such that the solder melts and rises between an inner wall of the receiving bore and an outer wall of the pipe.

13. The method according to claim 12, wherein the receiving bore opens radially into a cross section expansion on a side facing away from the transition step, and wherein after the heating step, excess solder is accommodated in the cross-section expansion.

14. The method according to claim 12, wherein the solder ring is inserted into the receiving bore and then the pipe is inserted into the receiving bore.

15. The method according to claim 12, wherein the receiving bore opens radially into a cross section expansion on a side facing away from the transition step, and wherein the solder ring is pushed onto the pipe and the pipe is subsequently inserted into the receiving bore, wherein the solder ring rests in the cross-section expansion before the heating step.

\* \* \* \* \*